United States Patent [19]

Ikuta et al.

[11] Patent Number: 4,731,951
[45] Date of Patent: * Mar. 22, 1988

[54] VEHICLE DOOR STRUCTURE

[75] Inventors: Hiroshige Ikuta; Yuji Okamoto, both of Toyota, Japan

[73] Assignee: Toyota Jidosha Kabushiki Kaisha, Japan

[*] Notice: The portion of the term of this patent subsequent to Sep. 8, 2004 has been disclaimed.

[21] Appl. No.: 943,868

[22] Filed: Dec. 22, 1986

Related U.S. Application Data

[63] Continuation of Ser. No. 677,751, Dec. 3, 1984.

[30] Foreign Application Priority Data

Dec. 26, 1983 [JP] Japan ............................ 58-203538[U]
Feb. 27, 1984 [JP] Japan ............................ 59-27643[U]

[51] Int. Cl.⁴ ............................................. E05F 11/38
[52] U.S. Cl. ............................... 49/374; 296/146; 49/488
[58] Field of Search ............... 49/227, 374, 348, 349, 49/350, 351, 352, 502, 488; 296/146

[56] References Cited

U.S. PATENT DOCUMENTS

| | | | |
|---|---|---|---|
| 1,891,478 | 12/1932 | Meatheringham | 49/374 |
| 2,024,773 | 12/1935 | Lohrman | |
| 2,819,066 | 1/1958 | Hadwin, Jr. | 49/227 |
| 2,925,268 | 2/1960 | Pierce | 49/351 X |
| 3,062,528 | 11/1962 | Martens | 49/227 |
| 3,422,574 | 1/1969 | Martens | 49/227 |
| 4,457,111 | 7/1984 | Koike | 49/502 |

FOREIGN PATENT DOCUMENTS

| | | |
|---|---|---|
| 0040588 | 11/1981 | European Pat. Off. . |
| 2435766 | 2/1976 | Fed. Rep. of Germany . |
| 2808235 | 8/1979 | Fed. Rep. of Germany . |
| 5683520 | 11/1979 | Japan . |
| 56-158321 | 4/1980 | Japan . |
| 158321 | 11/1981 | Japan ....................................... 49/374 |

Primary Examiner—Kenneth J. Dorner
Assistant Examiner—Gerald A. Anderson
Attorney, Agent, or Firm—Parkhurst & Oliff

[57] ABSTRACT

A vehicle door structure having an exterior surface of a door window located flush with an exterior surface of a door frame. The door window is vertically displaced in the door frame with the aid of a slider which is fixed to the end portion of the door window. The slider has a vertically extending groove therein into which the end portion of the door window is located. An adhesive is provided between the end portion of the door window and the inside of the slider to fix the door window to the slider. The door window is firmly fixed onto the slider by alternative or conjunctive means such as an enlarged bottom portion of the slider which contacts an end portion of the door window, or a stopper integrally provided on at least one end of the slider and a plurality of ribs which are horizontally disposed at different vertical positions in the groove of the slider. These alternative/conjunctive means serve to absorb stresses which occur from exterior forces experienced by the vehicle door structure.

3 Claims, 12 Drawing Figures

Fig. 12
PRIOR ART

VEHICLE DOOR STRUCTURE

This is a continuation of application Ser. No. 677,751 filed Dec. 3, 1984.

BACKGROUND OF THE INVENTION

The present invention relates generally to a vehicle door structure, and more particularly to a vehicle door structure having an exterior surface portion of a door window located in a vehicle door, such that it is almost flush with an exterior surface portion of an enclosing door frame. Further, the present invention provides an apparatus which secures more reliably a door window to a resilient member, the resilient member being attached by an adhesive to the door window.

The vehicle door structure of the present invention reduces undesirable air resistance and noise which are generated by wind passing across the exterior surface portions of the window and door frame. Further, this door structure eliminates the narrow field of view which is present in known devices. This vehicle door structure also improves the aesthetic appearance of the door assembly and provides for a more reliable attachment between the door window and a resilient member attached to the door window.

Figure 1:
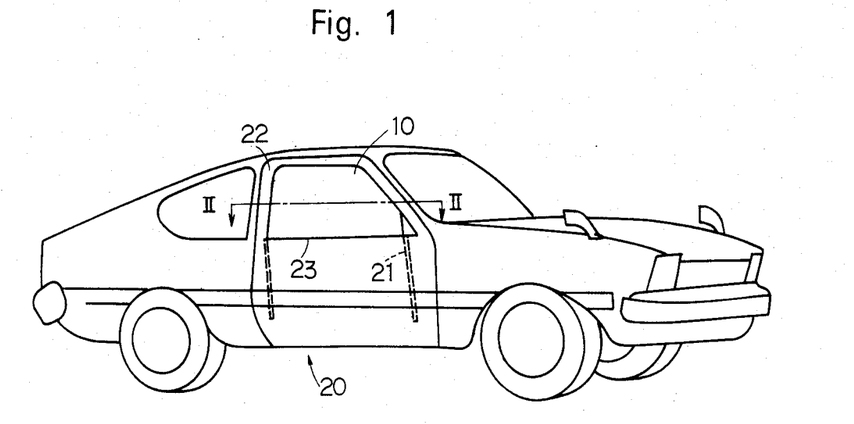
FIG. 1 is a perspective view of a vehicle body in which a vehicle door structure according to the present invention is applied.
Figure 11:
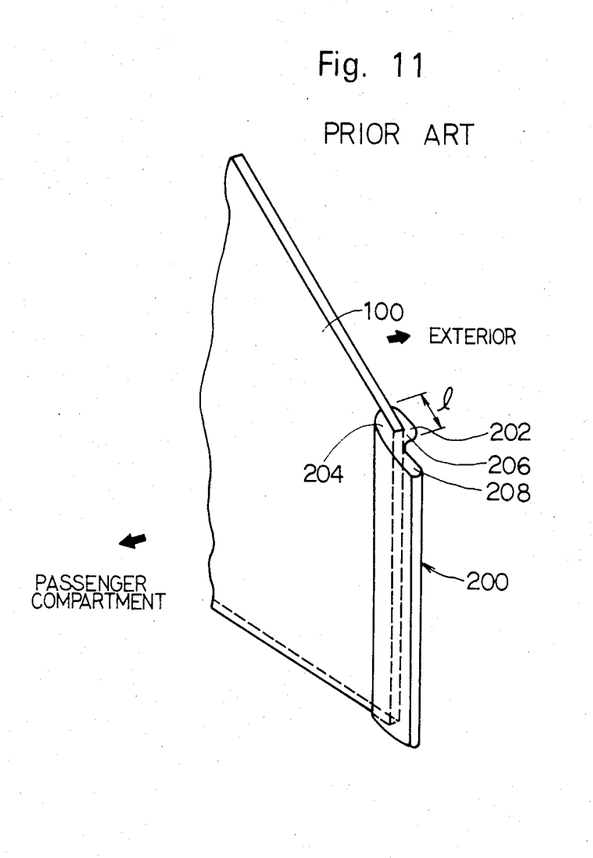
FIG. 11 is a partial perspective view of a known vehicle door structure.
Figure 12:
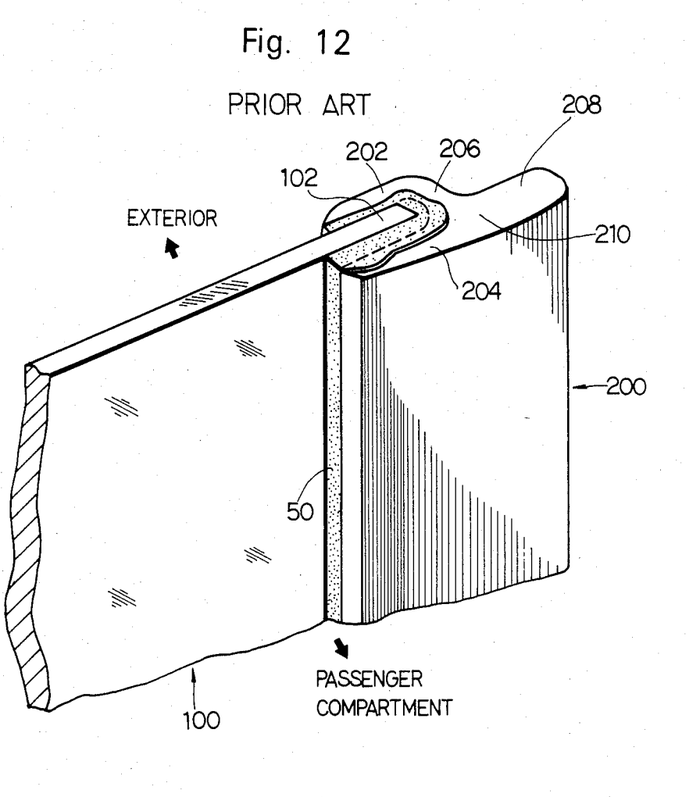
FIG. 12 is a partial perspective view of a known vehicle door structure.

An example of a known door structure is disclosed in Japanese Laid-Open Utility Model Sho 56-158322 (Japanese Utility Model Application No. Sho 55-58647), which is shown in FIG. 12. According to this known structure, a rear end portion 102 of a door window 100 is fixed to a slider 200 which guides the door window 100 during the vertical movement thereof. An adhesive 50 is provided between the rear end portion 102 of the door window 100 and the slider 200 to fix the door window 100 to the slider 200. FIG. 12 shows that an upper surface 210 of the slider 200 is horizontally sectioned. The slider 200 comprises an exterior portion 202, an interior portion 204, a connecting portion 206, and an end portion 208. The exterior portion 202 of the slider 200 extends in an almost parallel relationship with the exterior surface of the door window 100, and further is almost flush with the exterior surface of the door frame. The interior portion 204 of the slider 200 extends in an almost parallel relationship with the interior surface of the door window 100. The connecting portion 206 of the slider 200 extends laterally across the vehicle and connects the interior portion 204 with the exterior portion 202. The end portion 208 is formed from a continuation of the interior portion 204 such that it extends away from the door window 100. FIG. 11 shows that the slider 200 is fixed to the edge of the door window 100, such that it can be vertically displaced along a guide groove defined within a lower window frame 21, as shown in FIG. 1. The horizontal length "l" of the portions 202 and 204 is limited in size because when "l" is large, the field of view of an occupant in the vehicle is reduced and the aesthetic appearance of the vehicle is reduced. However, whenever "l" is reduced to be as small as possible, the rigidity in the area where the portions 202 and 204 of the slider 200 grasp the door window 100 is reduced. This results in the door window 100 being unstable in the area where the window glass 100 is fixed to the slider 200.

Further, FIG. 12 shows that the upper surface 210 of the slider 200 is cut away in the horizontal direction. When the end portion 208 of the slider 200 slides within the guide groove 21 of the door frame, the vertical sliding movement is met with a partial resistance due to frictional forces between ths slider 200 and the guide groove 21. These frictional forces cause a shearing force to be exerted upon the adhesive filled between the door window 100 and the slider 200. Hence, the adhering force of the adhesive must be sufficient to sustain the resultant shearing force, or the slider 200 might be separated from the door window 100. This separation is very undesirable.

SUMMARY OF THE INVENTION

The present invention was made in view of the foregoing background and to overcome the foregoing drawbacks. It is accordingly an object of this invention to provide a vehicle door structure which firmly secures a door window to a resilient slider portion.

To attain the above objects, a vehicle door structure according to the present invention has a door frame, a door window and a slider fixed to an end of the door window for guiding the door window during vertical movement thereof. The door frame is swingably mounted to a vehicle such that it opens and closes for a passenger to ingress or egress. The door window is provided in the door frame such that an exterior surface of the door window is substantially flush with an exterior surface of the door frame. The slider has a groove into which an end of the door window is fitted, such that the window is fixed to the slider by an adhesive filled between an inside portion of the slider and the end of the door window. Further, the door window is firmly supported by the slider. More specifically, the slider can have a lower portion which covers more of the interior and/or exterior surfaces of the window than the upper portion of the slider, thereby providing for more surface area contact between the window and the slider. Additionally, the slider can have extended grooved portions which permit ends of the door window to be located therein. Specifically, ends of the door window fit into the space defined within the extended slider groove, with vertical top and bottom portions of the groove being closed such that corners of the window are held therein. Furthermore, the slider can have a plurality of ribs separately provided at different vertical positions in a groove of the slider. These alternative or conjunctive structures cause the shearing forces resulting from vertical displacement of the window to be distributed to a larger surface contact area between the window and the slider, resulting in a more reliable assembly.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 2:
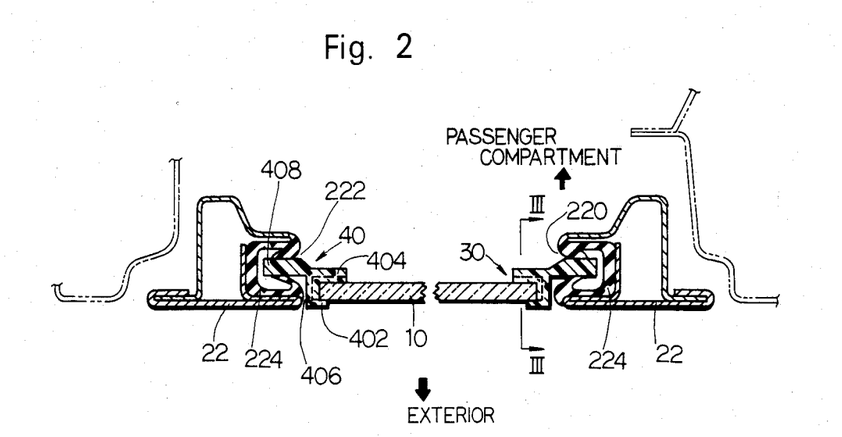
FIG. 2 is an enlarged cross-sectional view taken along the line II—II in FIG. 1.
Figure 4:
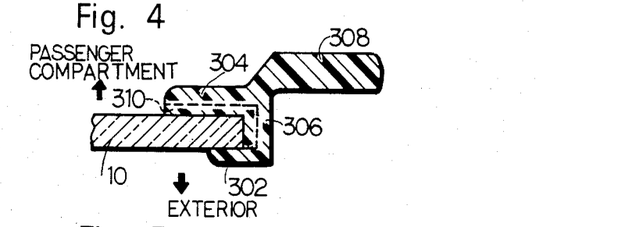
FIG. 4 is a cross-sectional view taken along the line IV—IV in FIG. 3.
Figure 5:
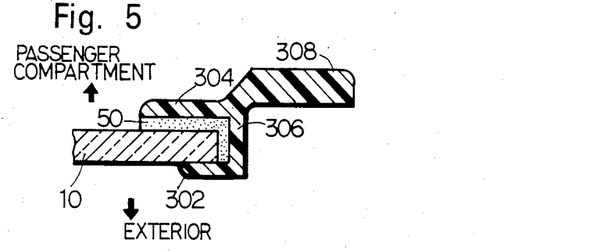
FIG. 5 is a cross-sectional view taken along the line V—V in FIG. 3.

FIG. 1 shows a perspective view of a vehicle body which utilizes a structure according to the present invention. A door window 10 is mounted such that it can be upwardly and downwardly displaced by a passenger's operation of a window crank (not shown in drawings) located within a door frame 22 of a door 20. FIG. 2 shows an enlarged cross-sectional view taken along the line II—II in FIG. 1. As shown in FIG. 2, the door window 10 is mounted within the door frame 22. The door frame 22 has door window guide grooves 220 and 222 at front and rear portions on the frame 22, respectively. A cushioning member 224 is provided within each of the grooves 220 and 222. The door window 10 is fixed to slider 30 and 40 at front and rear end portions thereof. FIGS. 4 and 5 show that the slider 30, which is made of synthetic resin, comprises an exterior portion 302, an interior portion 304, a connecting portion 306, and a front end portion 308. The exterior portion 302 of the front slider 30 extends in an almost parallel relationship with the exterior surface of the door window 10, and is almost flush with the exterior surface of the door frame 22. The interior portion 304 of the front slider 30 extends in an almost parallel relationship with the interior surface of the door window 10. The connecting portion 306 of the slider 30 extends laterally across the vehicle and connects the interior portion 304 with the exterior portion 302. The interior portion 304 of the slider 30 forwardly extends in the vehicle to form the front end portion 308. The forward end of the front end portion 308 fits into the groove 220 and is surrounded by the cushioning member 224.

Similarly, a rear slider 40, which is made of synthetic resin, comprises an exterior portion 402, an interior portion 404, a connecting portion 406, and a rear portion 408. The exterior portion 402 of the rear slider 40 extends in an almost parallel relationship with the exterior surface of the door window 10, and is almost flush with the exterior surface of the door frame 22. The interior portion 404 of the rear slider 40 extends in an almost parallel relationship with the interior surface of the door window 10. The connecting portion 406 of the rear slider 40 extends laterally across the vehicle and connects the interior portion 404 with the exterior portion 402. The interior portion 404 of the slider 40 rearwardly extends in the vehicle to form the rear end portion 408. The rearward end of the rear portion 408 fits into the groove 222 and is surrounded by the cushioning member 224.

Figure 3:
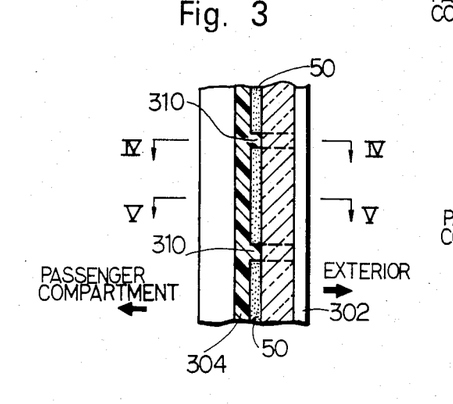
FIG. 3 is a partially enlarged cross-sectional view taken along the line III—III in FIG. 2.

The portions 304 and 306 of the front slider 30 have ribs 310 which partially surround the front portion of the door window 10. As shown in FIG. 3, a plurality of ribs 310 are separately provided at different vertical positions such that they properly locate the door window 10 within the slider 30. The front end of the door window 10 is fitted into the space defined between the portions 302, 304 and 306 of the front slider 30. An adhesive 50, such as a silicon adhesive or urethane adhesive, is fitted into the space defined between the door window 10 and the ribs 310, as shown in FIG. 5. The adhesive 50 fixes the front end of the door window 10 to the front slider 30. The rear end of the door window 10 is also fixed onto the rear slider 40 in a similar manner.

Figure 6:
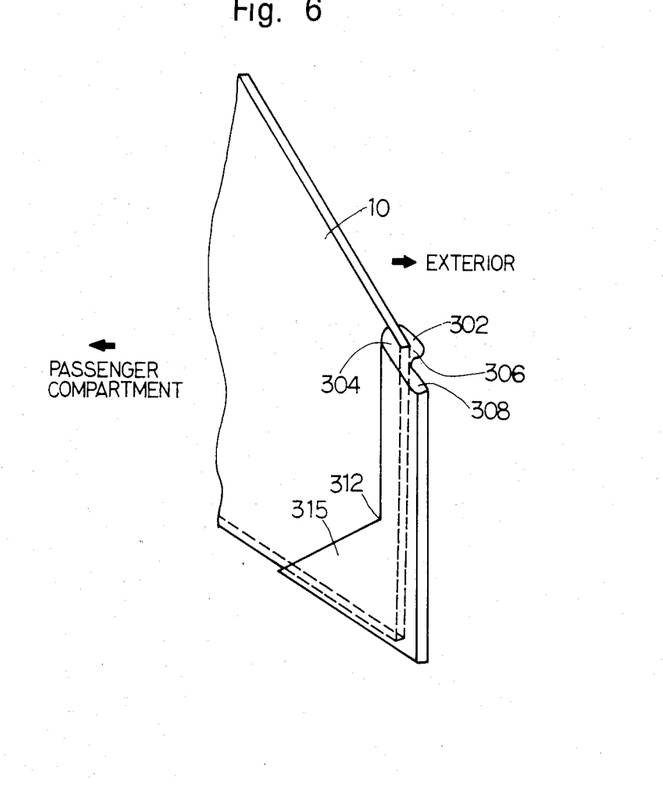
FIG. 6 is a partial perspective view of a vehicle door structure according to an embodiment of the present invention.

FIG. 6 shows a partial perspective view of a vehicle door structure according to another embodiment of the present invention. The portions 302 and 304 of the slider 30 extend to form enlarged portions 315 at lower portions thereof. The enlarged portions 315 are designed to be inclined in the rearward direction. The point 312 where the portion 304 begins to be inclined, is located such that it is underneath a belt line 23 of the door 20, identified in FIG. 1, when the door window 10 is completely closed. The enlarged portions 315 enhance the rigidity between the door window 10 and the slider 30. According to the embodiment shown in FIG. 6, the enlarged portions 315 are triangular in shape. However, the enlarged portions 315 may be square or round or any other appropriate shape. Further, according to the embodiment shown in FIG. 6, both portions 302 and 304 extend to form enlarged portions 315 at lower portions thereof. However, only one of the portions 302 and 304 must extend to form an enlarged portion at a lower portion thereof.

Figure 7:
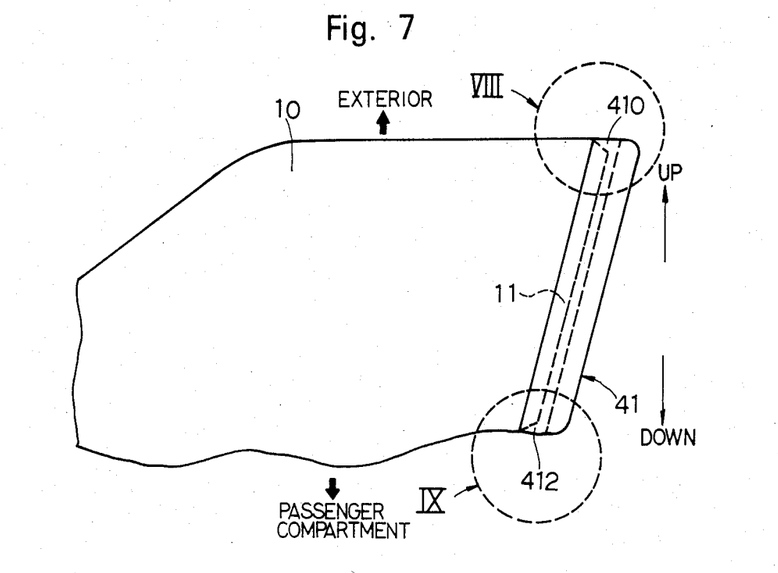
FIG. 7 is a partial perspective view of a vehicle door structure according to another embodiment of the present invention.

FIG. 7 shows a partial perspective view of a vehicle door structure according to another embodiment of the present invention. The encircled portions of the vehicle door structure indexed by arrows VIII and IX in FIG. 7, are shown in FIGS. 8 and 9, respectively, in an enlarged scale.

Figure 8:
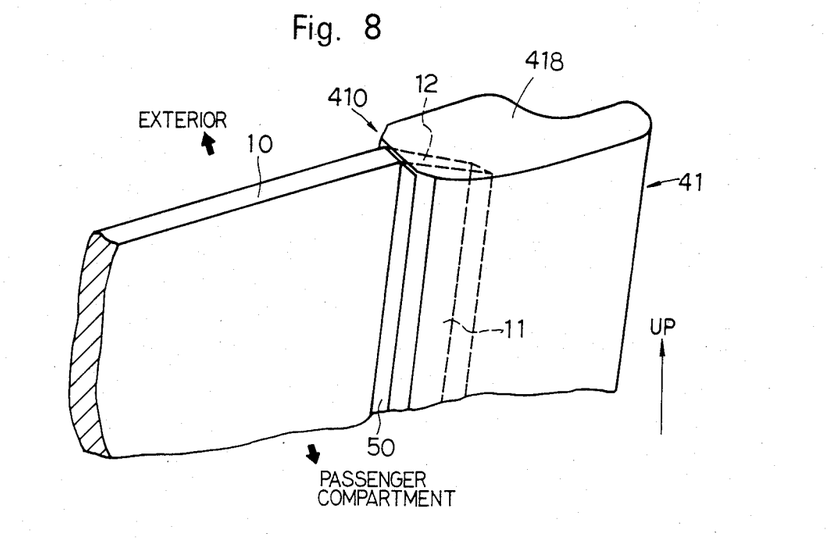
FIG. 8 is an enlarged perspective view of a portion of FIG. 7 indexed by the arrow VIII.
Figure 9:
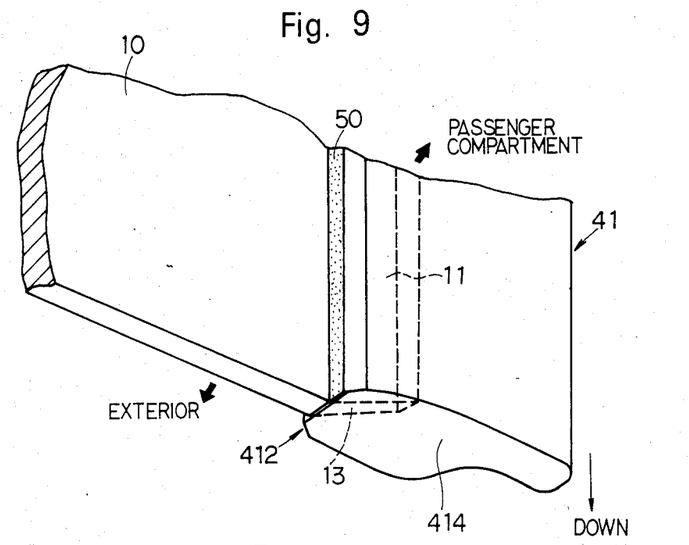
FIG. 9 is an enlarged perspective view of a portion of FIG. 7 indexed by the arrow IX.

A detailed discussion of the embodiment shown in FIG. 8 occurs in a related patent application entitled "Vehicle Door Structure" by YAO and OKAMOTO. This related patent application was filed in the U.S. Patent and Trademark Office on the same day that this patent application was filed and is co-pending herewith. The attorney docket number for this related patent application is Ser. No. 677,297 and is hereby expressly incorporated by reference. FIG. 8 shows that the door window 10 is secured by an adhesive 50 onto a slider 41. The rear vertical end portion 11 of the door window 10 is fitted into a groove defined within the slider 41. The adhesive 50 is provided between the rear vertical end portion 11 of the door window 10 and the slider 41. The slider 41 has stoppers 410 and 412 at its top and bottom portions, respectively, such that the rear corner portions 12 and 13 of the door window 10 engage therewith. The slider 41 has a flat surface 418 at its upper portion, which integrally extends toward the door window 10 to protrude on the groove of the slider 41 and forms the stopper 410. The rear upper corner portion 12 of the door window 10 fits into the groove of the slider 41, which is covered with the stopper 410 at its upper portion thereof.

Similarly, the slider 41 has a flat surface 414 at its lower portion, which integrally extends toward the door window 10 to protrude on the groove of the slider 41 and forms the stopper 412. The rear lower corner portion 13 of the door window 10 fits into the groove in the slider 41, which is covered with the stopper 416 at its lower portion thereof.

Figure 10:
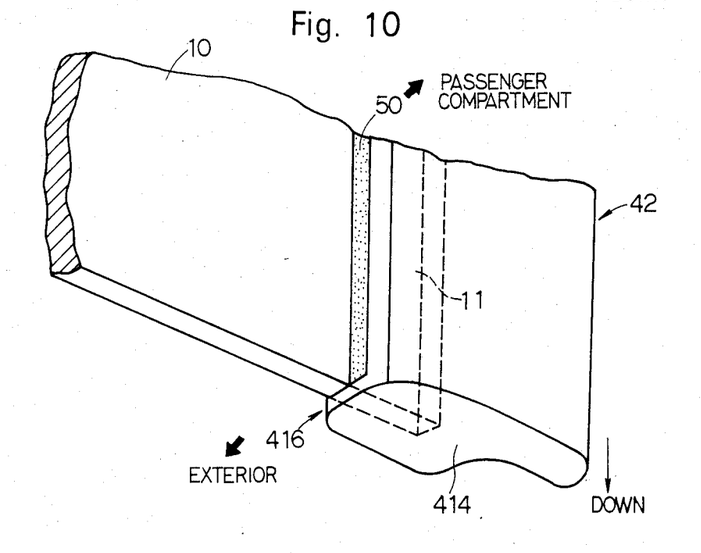
FIG. 10 is a perspective view of a vehicle door structure corresponding to FIG. 9, according to another embodiment.

FIG. 10 shows a perspective view of a vehicle door structure according to another embodiment of the present invention, wherein a lower stopper is slightly modified. The difference between the embodiment shown in FIG. 9 and the embodiment shown in FIG. 10 is that a lower surface 414 of a slider 42 is located in a lower horizontal plane than the lower surface 414 shown in FIG. 9. The surface 414 in FIG. 10 is horizontally lower because the door window 10 does not have an inclined rear lower corner. The surface 414 of the slider 42 extends in a downward direction, resulting in the stopper 416 having an increased thickness.

According to the embodiments shown in FIGS. 7-10, the rear corner portions 12 and 13 of the door window 10 engage with the stoppers 410, 412 and 416, respectively. Therefore, whenever external forces result from friction between the slider and the groove in the door frame, some of the external forces are transmitted to the stoppers 410, 412 and 416. Hence, even if the adhesive force of the adhesive filled between the door window and the slider is not sufficient to sustain the shearing force, the slider does not separate away from the door window because of this novel design.

Any of the preferred embodiments which have been discussed can be utilized in a door frame structure, individually or collectively, to improve the door frame. More specifically, the ribs 310 shown in FIG. 3 may be combined with the enlarged portion 315, shown in FIG. 6, and this combination can be further combined with the embodiments shown in FIGS. 7-20.

While the present invention has been described in its preferred embodiments, it is to be understood that the invention is not limited thereto, and may be otherwise embodied within the scope of the following claims.

What is claimed is:

1. A vehicle door structure, comprising:
a door frame swingably mounted to a vehicle, such that it opens and closes for a passenger to ingress or egress;
a door window having top and bottom edges, interior and exterior surfaces, and two substantially vertical edges, said door window provided in said door frame such that an exterior surface of said door window is substantially flush with an exterior surface of said door frame; and
a slider fixed to at least one of said substantially vertical edges of said door window for guiding said door window during an upward and downward displacement thereof, said slider comprising:
a first portion which extends in a substantially parallel relationship with said exterior surface of said door window;
a second portion which extends in a substantially parallel relationship with an interior surface of said door window;
a third portion which connects said first portion of said slider with said second portion of said slider;
an upper surface which contacts said first portion, said second portion and said third portion of said slider;
a lower surface which contacts said first portion, said second portion and said third portion of said slider; and
a plurality of ribs formed on the first and second portions and extending toward the door window and in contact therewith;
wherein said first and second portions of the slider have a groove formed therebetween, each of said first and second portions of the slider having an upper portion and a lower portion, there being a greater surface area of contact for equivalent vertical lengths of the slider between the door window and the lower portions of the slider than between the door window and the upper portions of the slider;
wherein said upper and lower surfaces of said slider function as caps which extend from said third portions for part of the distance between the substantially vertical window edges to maintain said at least one of said substantially vertical edges of the door window within said groove; and
further wherein said ribs partition said groove into a plurality of spaces created between adjacent ribs, the slider and the door window, whereby the ribs absorb at least a portion of stresses existing at an interface between the slider and the door window, said at least one of said substantially vertical edges of the door window being fixed within the groove of the slider by an adhesive placed between an inside portion of the groove in the slider and said at least one of said substantially vertical edges of the door window.

2. The vehicle door structure of claim 1, wherein each of said lower portions of said first portion and said second portion is connected to one of said pair of extensions.

3. A vehicle door structure comprising:
a door frame swingably mounted to a vehicle, such that it opens and closes for a passenger to ingress or egress;
a door window having top and bottom edges, interior and exterior surfaces, and two substantially vertical edges, said door window provided in said door frame such that an exterior surface of said door window is substantially flush with an exterior surface of said door frame; and
a slider fixed to at least one of said substantially vertical edges of said door window for guiding said door window during an upward and a downward displacement thereof, said slider including a substantially vertically extending base, a pair of substantially vertically extending extensions which project laterally from said base to define a gap therebetween, an upper bridge extending from an upper end of said base for part of the distance between the substantially vertical edges of the door window and bridging upper ends of said pair of extensions, an upper surface of said bridge being substantially flush with the upper end of said base and the top edge of said door window, a lower bridge extending from a lower end of said base for part of the distance between the substantially vertical edges of the door window and bridging lower ends of said pair of extensions, and a plurality of ribs which extend into said gap from one of said pair of extensions;
wherein said one substantially vertical edge of said door window is positioned within said gap between said pair of extensions, base and upper and lower bridges, said bridges and said pair of extensions cooperate to surround a plurality of corner portions of the door window, a recess between said slider and said one substantially vertical edge of said door window within said gap is filled with an adhesive, and said ribs partition said recess into a plurality of spaces created between adjacent ribs, the slider and the door window, whereby the ribs absorb at least a porton of stresses existing at an interface between the slider and the door window, said at least one of said substantially vertical edges of the door window being fixed within said recess of the slider by an adhesive placed between an inside portion of said recess in the slider and said at least one of said substantially vertical edges of the door window.

* * * * *